United States Patent [19]
Siddiqui

[11] Patent Number: 5,890,514
[45] Date of Patent: *Apr. 6, 1999

[54] SHUTOFF VALVE AND FILTER IN THERMOPLASTIC MATERIAL SUPPLY SYSTEM

[75] Inventor: Shahid A. Siddiqui, Roswell, Ga.

[73] Assignee: Nordson Corporation, Westlake, Ohio

[*] Notice: This patent issued on a continued prosecution application filed under 37 CFR 1.53(d), and is subject to the twenty year patent term provisions of 35 U.S.C. 154(a)(2).

[21] Appl. No.: 550,030

[22] Filed: Oct. 30, 1995

[51] Int. Cl.⁶ .................................................. B01D 35/02
[52] U.S. Cl. ........................... 137/550; 210/234; 210/432
[58] Field of Search .................................. 137/549, 550; 210/234, 432

[56] References Cited

U.S. PATENT DOCUMENTS

| 2,057,779 | 10/1936 | Jacobs | 210/234 X |
| 3,645,401 | 2/1972 | Roberts | 210/432 X |
| 3,912,630 | 10/1975 | Reighard et al. | 210/130 |
| 3,964,645 | 6/1976 | Scholl | 222/146.5 |
| 4,615,812 | 10/1986 | Darling | 210/234 X |
| 4,666,066 | 5/1987 | Boccagno et al. | 222/146.5 |
| 4,701,118 | 10/1987 | Koching et al. | 210/234 X |
| 4,722,794 | 2/1988 | Duncan | 137/550 X |
| 4,725,215 | 2/1988 | Kreyenborg et al. | 210/234 X |
| 4,832,077 | 5/1989 | Pilolla | 137/549 |
| 4,946,047 | 8/1990 | Kurokawa et al. | 137/549 X |

FOREIGN PATENT DOCUMENTS

| 0743151 | 11/1996 | European Pat. Off. |
| 1333860 | 12/1963 | France | 210/432 |
| 3732205 | 9/1988 | Germany . |

*Primary Examiner*—John Rivell
*Attorney, Agent, or Firm*—Rankin, Hill, Porter & Clark LLP

[57] ABSTRACT

A system for supplying molten thermoplastic material to a dispenser comprises a hopper for storing the thermoplastic material. A heating grid is associated with the hopper for heating and melting the thermoplastic material. A reservoir block receives melted material from the grid. The reservoir block includes a reservoir into which the melted material flows from the grid. A manifold and pump assembly is connected to the reservoir block for receiving material from the manifold block and pumping the material to a dispenser. A valve and filter assembly is mounted in the reservoir block. The valve and filter assembly includes a valve member capable of moving between an open position and a closed position for blocking the flow the material through the reservoir block, and includes a filter member for filtering material, the filter being removable to clean the filter.

4 Claims, 8 Drawing Sheets of material to the pump is shown in U.S. Pat. No. 4,667,850. Removal of the pump has still been difficult because the

SHUTOFF VALVE AND FILTER IN THERMOPLASTIC MATERIAL SUPPLY SYSTEM

BACKGROUND OF THE INVENTION

1. Field of the Invention

This invention relates to apparatus for melting and supplying thermoplastic materials to a dispensing system.

2. Description of the Prior Art

Thermoplastic materials or so-called "hot melt" materials have been used for many years for various purposes, including as adhesives in the manufacturing of products such as disposable diapers and in the manufacturing of packaging. Historically, the thermoplastic material was converted from a solid to a molten state in a tank having heated walls. The melted material was maintained in the molten state in the tank in sufficient volume to supply one or more applicators or dispensers. If the job or application required a substantial volume of hot melt material, a substantially large volume of material was required to be maintained in the molten or melted state, necessitating a long warm up or start up time for the apparatus, as well as prolonged exposure of at least some of the molten material to heat and/or to oxygen.

To avoid these problems, so-called grid-type hot melt supply systems were developed in which the solid thermoplastic material was stored in a hopper and melted upon the top of a heated grid located at the bottom of the hopper. The melted material then passed through holes in the grid into a relatively small holding reservoir from which the molten material was supplied by a pump beneath the reservoir to a dispenser. Grid-type supply systems have been capable of melting and supplying thermoplastic material at a very high rate, and the molten material is not maintained in a molten state for prolonged periods of time to char, oxidize, or otherwise degrade. A typical grid type hot melt supply system is disclosed in U.S. Pat. No. 3,946,645.

These grid-type hot melt supply systems have typically comprised a reservoir with a heated grid mounted on top of the reservoir. A hopper for receiving the solid thermoplastic material was mounted atop the heated grid. Mounted beneath the reservoir was at least one pump for pumping the molten thermoplastic material through one or more supply hoses which were connected to the pump. A flow passage was provided from the reservoir outlet to the pump inlet.

One problem with these hot melt supply systems has been that, in use, various extraneous objects or impurities could enter the hopper. Larger objects and impurities were prevented from passing through the openings in the grid, but smaller objects could pass through the grid and eventually reach the pump, resulting in periodic failure or clogging of the pump. If the pump failed or became clogged, it had to be removed and repaired or replaced.

To avoid draining the system of the thermoplastic material if the pump needed to be removed, a manually operated gate-type valve was sometimes located in the molten thermoplastic flow path between the reservoir outlet and the pump. An example of such a valve is shown in U.S. Pat. No. 4,666,066. This valve made it possible stop the flow of molten thermoplastic material to the pump whenever the pump needed to be removed, and the pump could then be removed without the necessity of first draining the entire reservoir of molten thermoplastic material. Another example of a flow shutoff valve that could be used to shut off the flow of material to the pump is shown in U.S. Pat. No. 4,667,850. Removal of the pump has still been difficult because the motor for driving the pump had to be disconnected from the pump in the course of removing the pump from the system, and to facilitate quick disconnection of the driving motor from the pump, U.S. Pat. No. 4,666,066 also discloses the provision of a motor mount to enable the pump to be more quickly removed from the system.

Although the presence of the gate-type valve and the quick disconnection of the pump motor make it easier to remove the pump to change or to repair the pump, servicing the pump should be performed as infrequently as possible, since it requires that the system be shutdown, and system shutdown should be avoided, since it allows the material in the hopper and the reservoir to solidify. After the material solidifies, it must thereafter be remelted, resulting in loss of system efficiency and capability. The removal and replacement of the pump still results in long downtimes of the supply system, and substantial quantities of wasted thermoplastic material.

Pump servicing can be reduced by providing a filter in the material flow path between the reservoir and the pump, but such a filter must be periodically removed for cleaning, and the flow path should be closed when the filter is removed to prevent the inadvertent leakage of molten thermoplastic material from the flow path.

SUMMARY OF THE INVENTION

The present invention overcomes the difficulties of the prior art by providing a flow shutoff valve which is combined with a removable filter. The combined valve and filter assembly can be closed to conveniently shut off the flow of molten thermoplastic material to the pump and can be opened to allow the material to be filtered to prevent undesirable foreign objects or debris from reaching the pump. The present invention provides a flow shutoff valve for a grid-type molten thermoplastic material supply system which provides an easy and convenient shutoff of the flow of molten material to the pump, so that the pump can be more easily removed for repair and replacement. In addition, the filter, which is combined with the valve, prevents various extraneous objects or impurities from reaching the pump, so that pump servicing is performed less frequently.

The valve and filter assembly of the present invention also provides for easy removal of the filter for cleaning. The valve includes an interlocking mechanism that prevents the filter from being removed unless the valve is closed, so that molten thermoplastic material will not be inadvertently spilled. This interlocking mechanism assures that the filter will only be removed when there is no flow of molten thermoplastic material to the pump, and prevents inadvertent removal of the filter while the valve is open.

These and other advantages are provided by the present invention of a system for supplying molten thermoplastic material to a dispenser. The system comprises a hopper for storing the thermoplastic material. A heating grid is associated with the hopper for heating and melting the thermoplastic material. A reservoir block receives melted material from the grid. The reservoir block includes a reservoir into which the melted material flows from the grid. A manifold and pump assembly is connected to the reservoir block for receiving material from the reservoir and pumping the material to a dispenser. A valve and filter assembly is mounted in the reservoir block. The valve and filter assembly includes a valve member capable of moving between an open position and a closed position for blocking the flow the material through the reservoir block, and includes a filter member for filtering material, the filter being removable to clean the filter.

DETAILED DESCRIPTION OF THE PREFERRED EMBODIMENT

Figure 1:
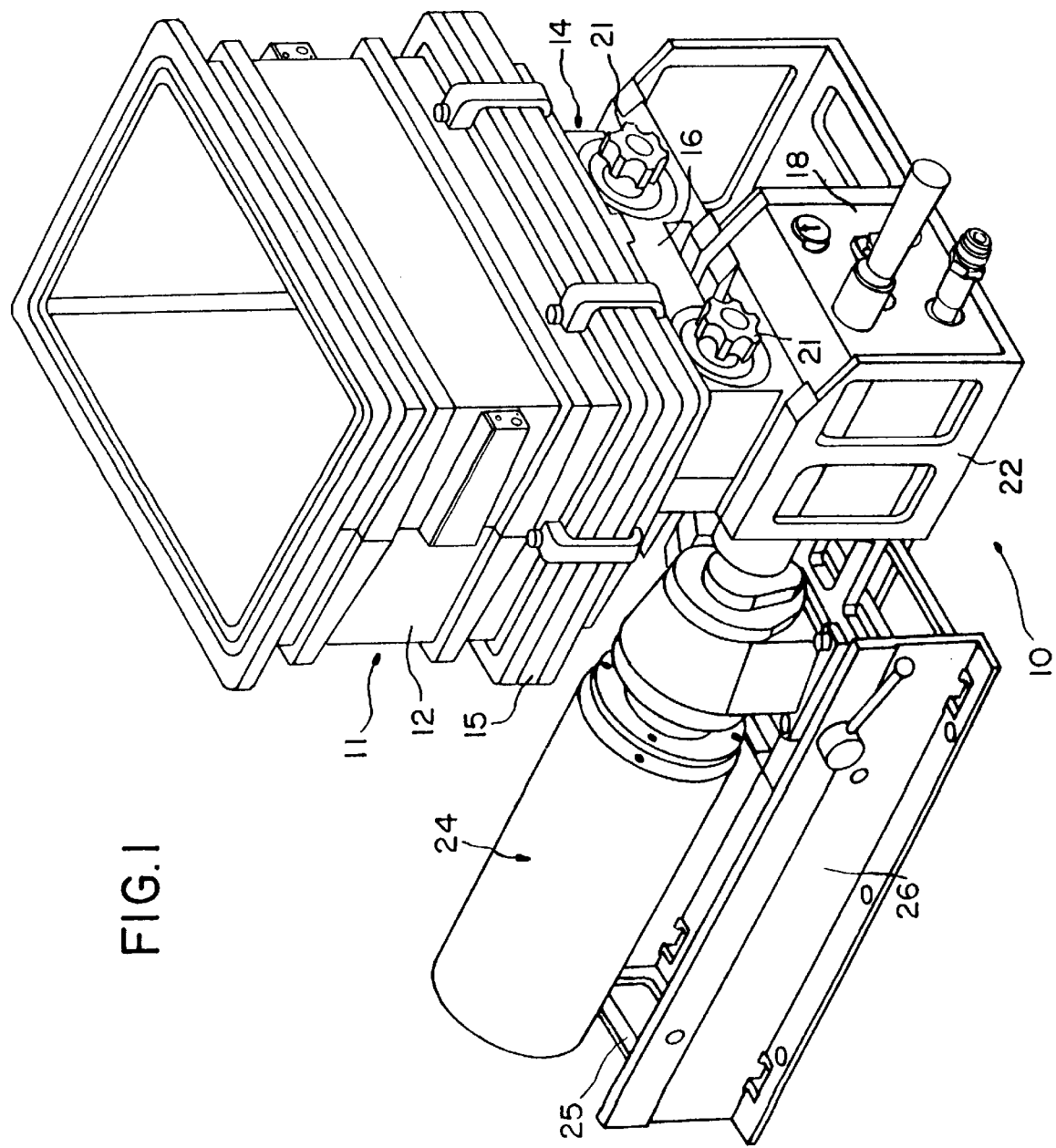
FIG. 1 is a perspective front view of the thermoplastic supply system of the present invention, with the support structure omitted.
Figure 2:
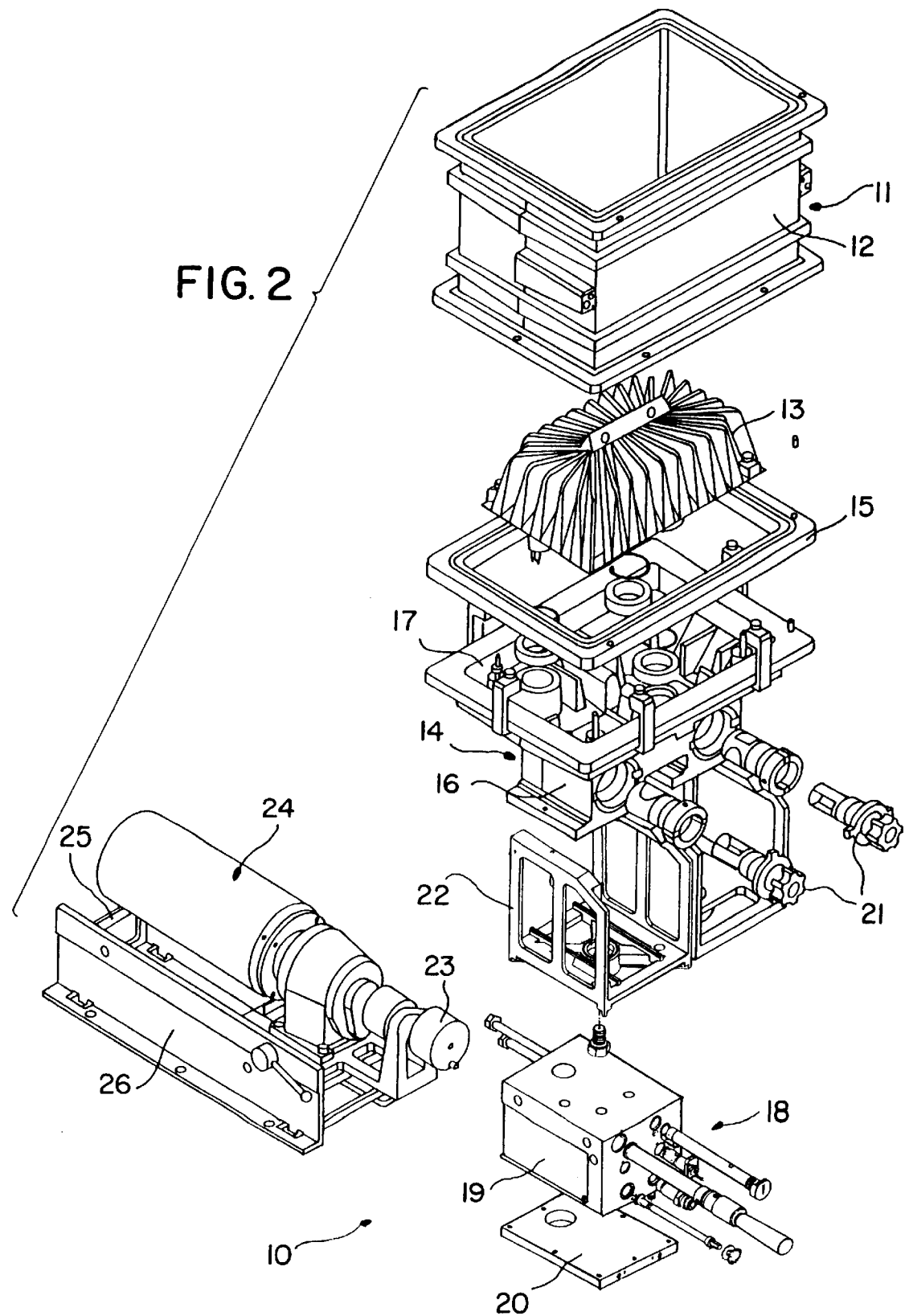
FIG. 2 is an exploded perspective front view of the thermoplastic supply system of FIG. 1.

Referring more particularly to the drawings and initially to FIGS. 1 and 2, there is shown the thermoplastic material supply system 10 of the present invention. The system is used for various purposes, such as to apply hot melt adhesive in a manufacturing line for specific products, such as for disposable diapers. A manufacturing line of disposable diapers may include, by way of example, a station for applying adhesive to the left and right leg elastic, to the waist elastic attachment and to the cuff elastic. The supply system 10 is connected to dispensers or applicators located at the manufacturing line by means of heated supply hoses. Various types of dispensers or applicators may be in the manufacturing line to apply the material, and these dispensers are not part of this invention. The supply system 10 is used to heat the solid thermoplastic material and to supply the molten material through various numbers of supply hoses to the dispensers.

The system 10 comprises a hopper assembly 11 for receiving and storing a supply of solid thermoplastic material. The hopper assembly 11 comprises one or more hopper units 12. The top of the hopper assembly 11 is open, allowing solid thermoplastic material to be placed in the hopper assembly. The bottom of the hopper assembly 11 is also open providing an outlet, and a heating grid 13 is mounted within the outlet of the hopper assembly. The heating grid 13 is used to melt the solid thermoplastic material in the hopper. Although the grid 13 is not in the form of a grid in the conventional definition of the term, since it is in the form of a pyramid-shaped cast block, it replaces the heating grids used in prior art systems, so it is called a "grid." The hopper assembly 11 is supported on a reservoir assembly 14 located below the hopper assembly 11, with a ceramic isolator 15 mounted therebetween. The reservoir assembly includes a block 16, the upper surface of which forms a reservoir 17 which receives a supply of melted material from the hopper assembly 11. Inside the reservoir block 16 are a pair of passageways through which the molten thermoplastic flows from the reservoir to a pair of manifold assemblies 18 positioned beneath the reservoir block. (Only one of the manifold assemblies is shown in FIGS. 1 and 2.) Each manifold assembly 18 includes a manifold block 19. The manifold block 19 may include an internal heater or may be heated by means of a separate attached heater plate 20. The reservoir assembly 14 includes a pair of flow shutoff valves 21 mounted in the reservoir block 16 each of which allows the flow of molten material through one of the passageways to one of the manifold assemblies to be shut off. Each of the flow shutoff valves 21 also includes a filter or protection screen to prevent extraneous particulate material from reaching the pump. The manifold assemblies 18 are inserted into a manifold harness or saddle 22 which is suspended from the bottom of the reservoir block 16. The manifold assembly is inserted into the harness and held securely against the reservoir block by means of a screw jack assembly. A pump 23 is adapted to be inserted into each of the manifold assemblies 18. Each of the pumps 23 is connected to a drive assembly 24, and the pump and the drive assembly are mounted on a horizontally moveable carriage 25 which moves on a carriage support 26. Each of the manifold assemblies 18 includes a connection for one or more supply hoses (not shown). The molten thermoplastic material is pumped from the manifold assembly 18 to dispensing heads through the supply hoses.

Figure 3:
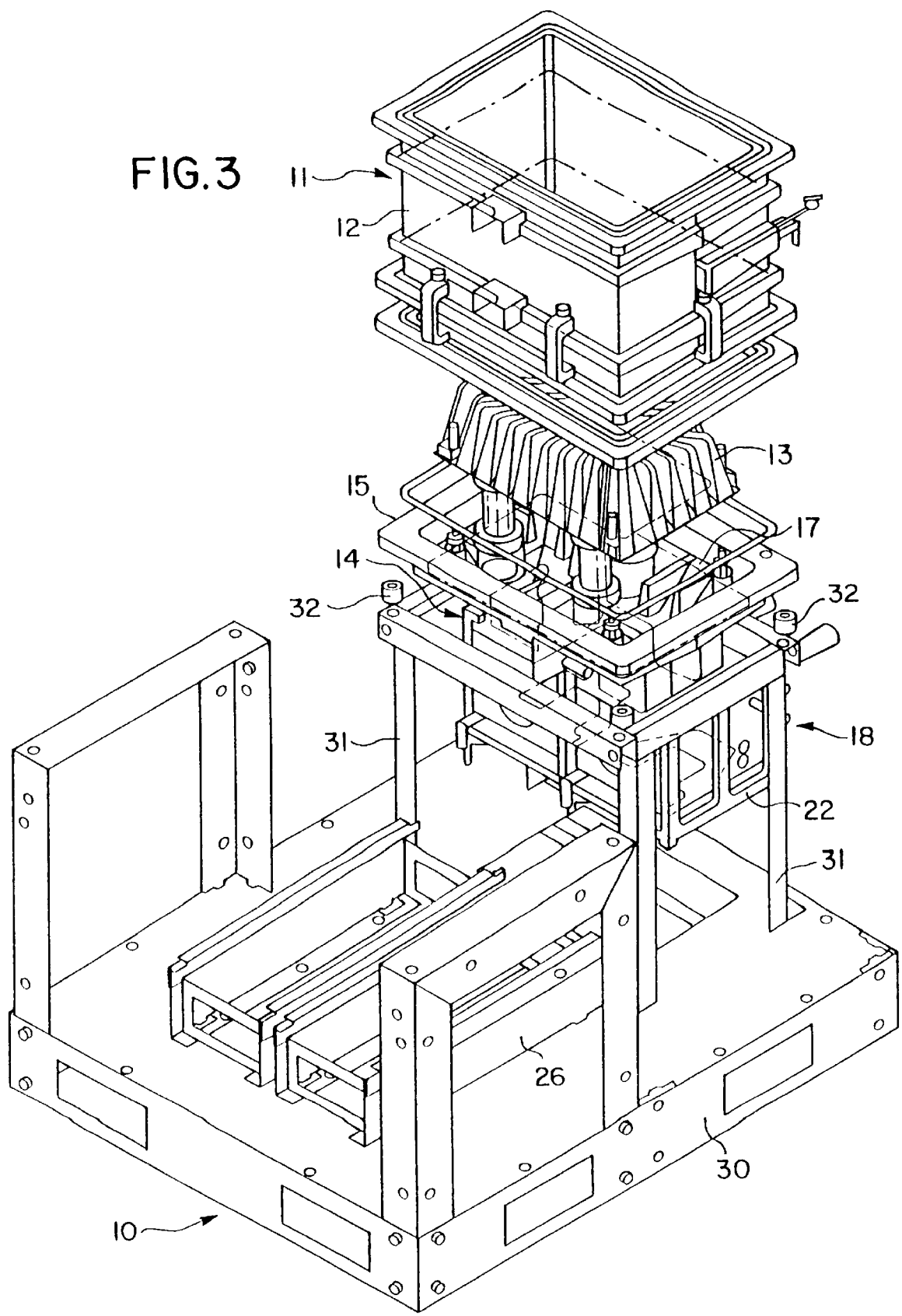
FIG. 3 is another exploded perspective view of the thermoplastic supply system of FIGS. 1 and 2 taken from the rear of the system with the support structure included, but with the drive assembly removed.

The support structure for the supply system 10 is not shown in FIGS. 1 and 2 for the sake of clarity, but it is depicted in FIG. 3. As shown in FIG. 3, the supply system 10 is supported on a base 30 upon which a upstanding frame 31 is mounted. The carriage support 26 is also mounted on the base 30. The reservoir block 16 is supported on the frame 31 with a plurality of isolating spacers 32 mounted therebetween.

While two flow shutoff valves, two manifold assemblies, and two pumps and drive assemblies are shown or described, this is intended to show a typical configuration of the system, and it should be understood that one or more of each of these elements could be used.

As used herein, the "front" of the system 10 and its components is considered to be the side of the system extending forward and to the right in FIGS. 1 and 2, which is also the side from which the shutoff valves 21 are mounted. The "rear" of the system 10 and its components is considered to be the opposite side, that is, the side extending back and to the left in FIGS. 1 and 2, which is also the side from which the drive assembly 24 extends.

Figure 5:
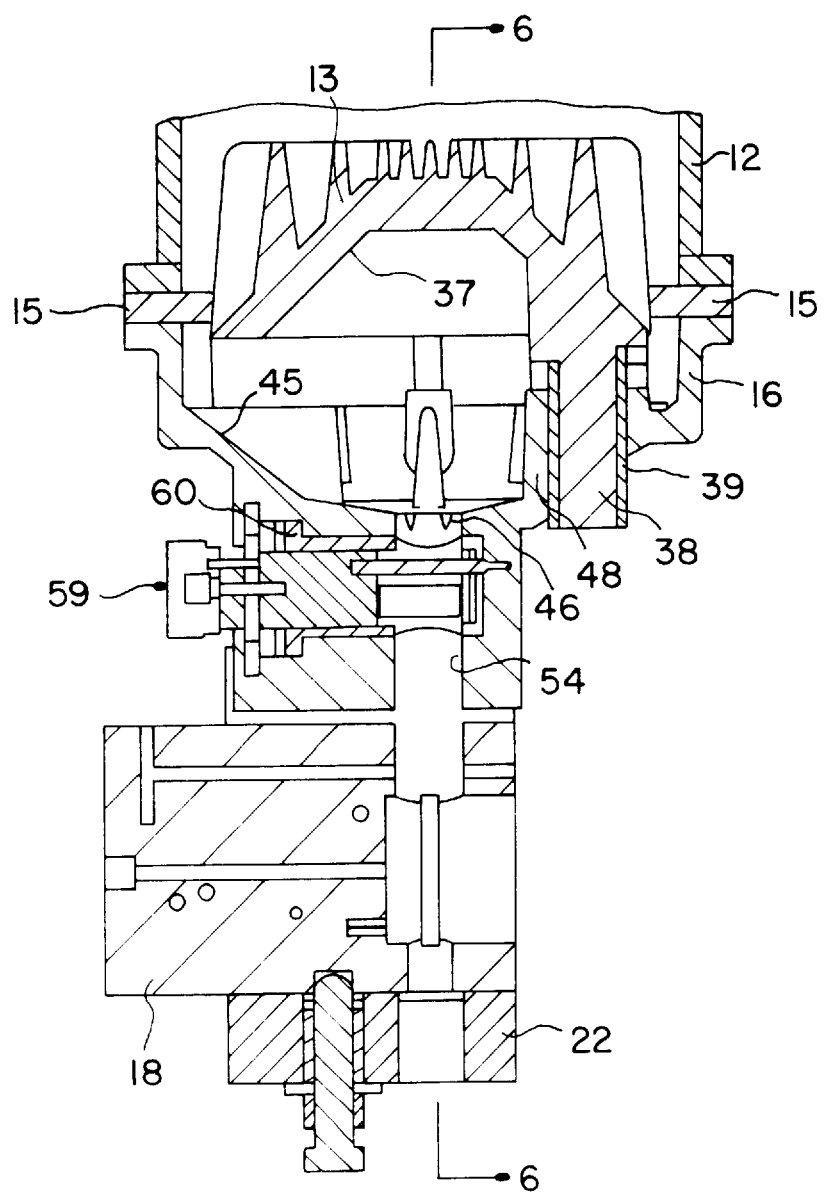
FIG. 5 is a side sectional view taken along line 5—5 of FIG. 4.

The heating grid 13 is used as the primary means for heating and melting the solid thermoplastic material in the hopper assembly 11. The grid 13 is formed of a solid casting having a generally pyramid shape with a central hollow cavity 37 (FIG. 6) formed beneath the grid body. A plurality of heating fins extend from the upper surface of the grid and increase the surface area of the grid to improve heat transfer. Electrical inductive heating elements are cast into the casting when it is formed. The grid 13 is supported primarily on mounting feet 38 (FIG. 5) which extend from the bottom of the grid and support the grid from below on the upper surface of the reservoir block 16. A ceramic isolator sleeve 39 is provided at the lower end of each foot 38 between the foot and the upper surface of the reservoir 17 to thermally isolate the grid 13 from the reservoir and allow the temperature of the heated reservoir to be set independently of that of the grid. The grid 13 is also bolted to the top of the reservoir block using bolts 40 (FIG. 6) to laterally position the grid. The hollow recess or cavity 37 beneath and inside the grid 13 allows for expansion of the material in the reservoir 17 beneath the grid when the material cools.

The reservoir block 16 is preferably also made from a casting of a material having good heat transfer characteristics, such as aluminum. As shown, the upper surface of the reservoir block 16 forms the reservoir 17 for the material which flows over the grid 13. The reservoir 17 is generally in the form of a sink with slopping side walls 45 leading to a pair of outlets 46. The side walls 45 are preferably coated with a material having non-adhesion properties, such a polytetrafluoroethylene (PTFE) to prevent the material in the reservoir from sticking to the side walls. Electrical inductive heating elements are cast into the reservoir block 16 to provide for heating of the material in the reservoir 17 to maintain the temperature of the material in the reservoir. Fins 47 are provided extending from the sloped side walls of the reservoir to increase the surface area of the heated reservoir and to assist in heat transfer to the material in the reservoir. Three cylindrical grid support posts 48 extend from the bottom of the reservoir 17 and are used to support the feet 38 of the heating grid 13. A trough 49 is formed in the bottom of the reservoir between the outlets 46 to permit molten thermoplastic material to easily drain into either of the outlets when the molten material reaches the bottom of the reservoir.

While two outlets 46 are shown, it should be understood that a greater or lesser number of outlets can also be provided depending upon the design needs of the particular system. In the system shown there are two manifold assemblies 18, so that two outlets 46 are needed, one to feed each of the manifold assemblies.

Figure 6:
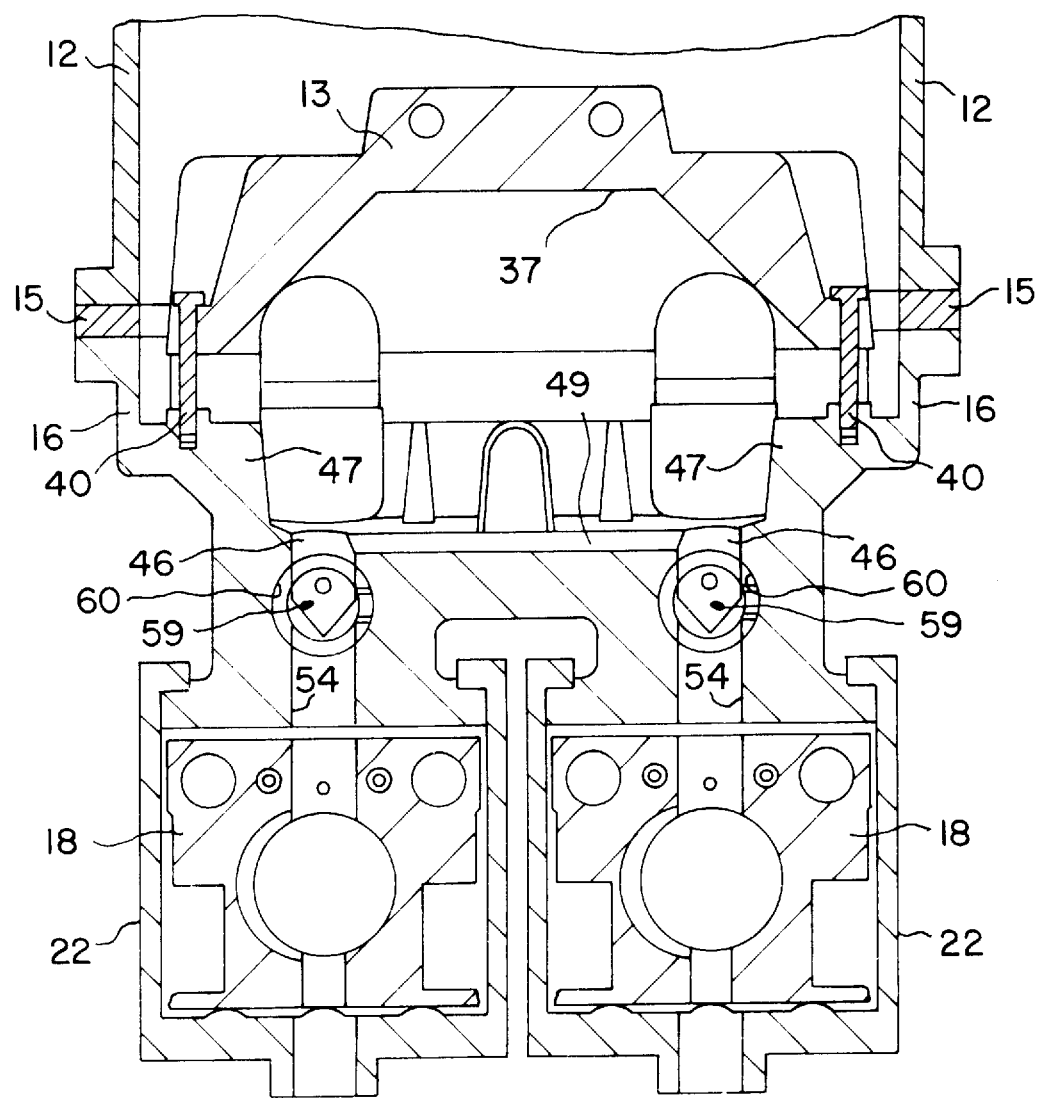
FIG. 6 is a side sectional view taken along line 6—6 of FIG. 5.

The molten thermoplastic material flowing through each of the reservoir outlets 46 flows through a passageway 54 extending vertically through the reservoir block 16. As shown in FIG. 6, a separate passageway 54 is provided in the reservoir block 16 for each of the outlets 46, with two passageways shown in the illustrated embodiment. The flow shutoff valve 21 is provided for each of the vertically extending passageways 54. The flow shutoff valve 21 preforms two functions. First, it provides a shutoff to the flow of molten material to the pump. For example, if the pump manifold is removed for servicing or replacement, the valve 21 can be closed to allow this to take place without draining the system. Second, the shutoff valve 21 includes a screen or filter which provides for the filtering of larger particles which may have fallen into the hopper before these particles reach the pump. In addition, the filter is removable for cleaning, and the valve must be closed when the filter is removed.

Figure 7:
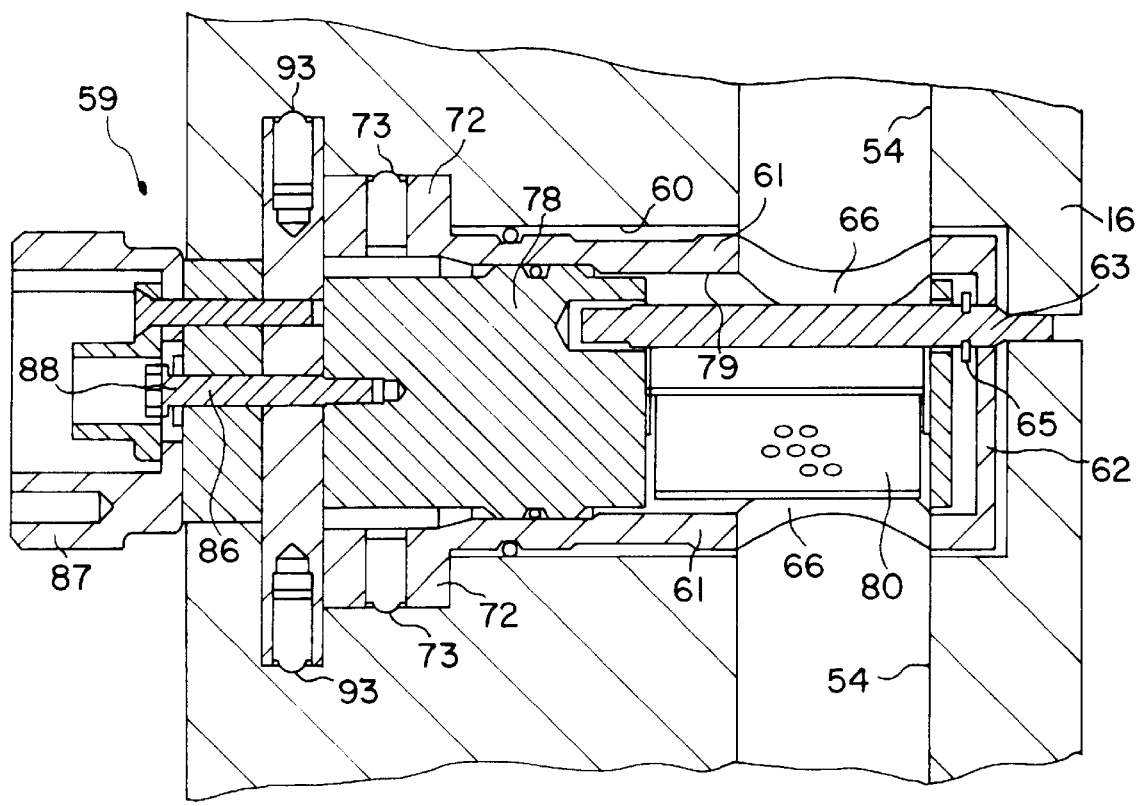
FIG. 7 is a detail of the valve assembly of FIG. 5 to a larger scale.
Figure 8:
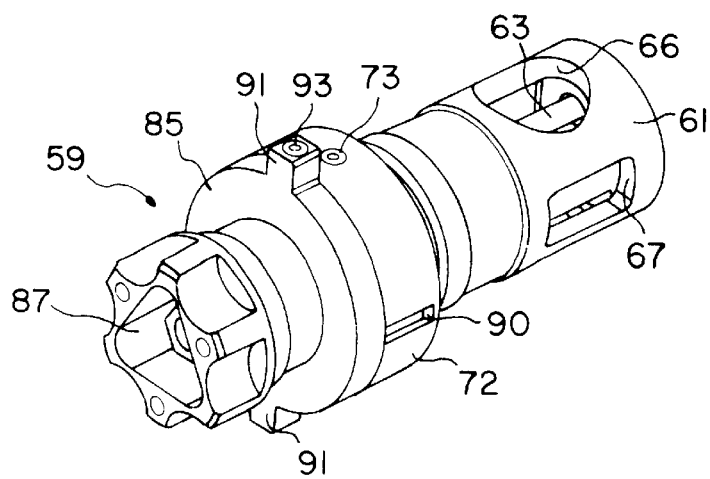
FIG. 8 is perspective view of the valve assembly of FIG. 7 removed from the reservoir block.
Figure 9:
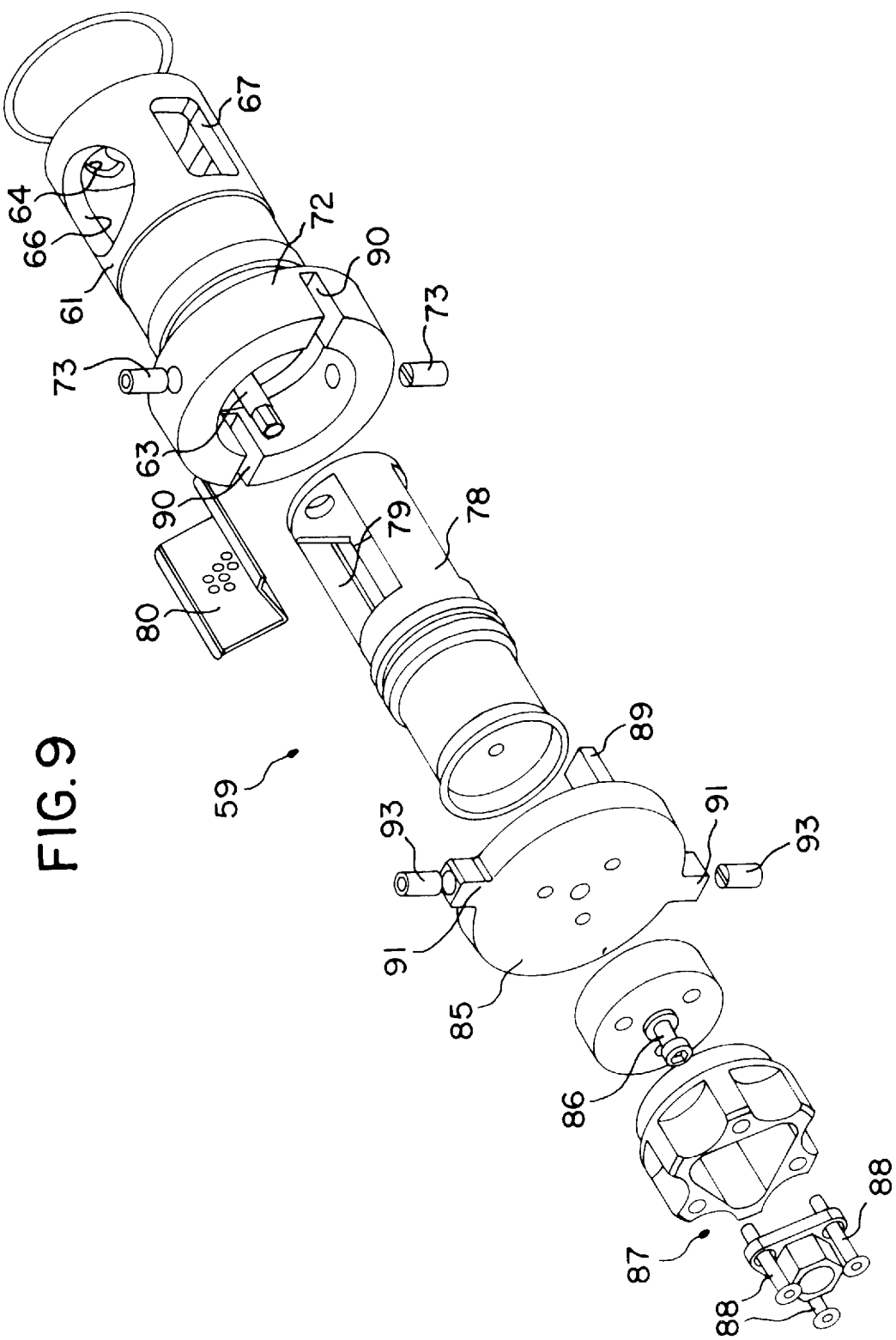
FIG. 9 is an exploded perspective view of the valve assembly of FIG. 8.

The flow shutoff valve 21 is shown in more detail in FIGS. 6-8. The valve 21 comprises a valve assembly 59 which is adapted to fit into a corresponding horizontally extending bore 60 in the reservoir block 16. The bore 60 extends horizontally from the front surface of the reservoir block 16 to beyond the vertically extending passageway 54. The valve assembly 59 includes a cylindrical valve member or sleeve 61 which fits within the bore 60 and is capable of rotating within the bore to open and close the valve. A circular end wall 62 is provided on the rearward end of the sleeve. The sleeve 61 is pinned to the reservoir body by a bolt or positioning pin 63 which extends from the rear of the bore 60. An arcuate slot 64 is formed in the sleeve end wall 62 into which the positioning pin 63 is received. A locking ring 65 is mounted on the positioning pin 63 in front of the sleeve end wall 62, so that the sleeve is captured within the bore 60. The sleeve 61 has a pair of coaxial circular flow openings 66 therein which are aligned with the passageway 54 in the reservoir block 16 when the sleeve is in the valve open position as shown in FIG. 7. At 90° with respect to the axis of the openings 66, the sleeve 61 is closed on one side, and on the other side a smaller rectangular drain hole 67 is provided. The rotational movement of the sleeve 61 is limited by the movement of the positioning pin 63 within the arcuate slot 64, so that the sleeve can only rotate between a valve open position in which the openings 66 are coaxial with the passageway 54 and a valve closed position in which the closed side wall blocks the passageway at the top of the bore 60 and the drain hole 67 is coaxial with the passageway at the bottom of the bore. The valve closed position is at 90° with respect to the valve open position.

The forward end of the sleeve 61 is has a collar 72 which is larger in diameter than the sleeve. A pair of holding pins 73 extend radially outwardly from the collar 72 on opposite sides of the collar. Each of the pins 73 are urged outwardly by springs captured within the pins. When the sleeve 61 is positioned in the valve open position with the openings 66 aligned with the passageway 54, each of the pins 73 extend outwardly to engage corresponding indentations on the interior wall of the bore 60 in the reservoir block 16. In this manner, the valve assembly 59 is held in the valve open position, but the valve assembly can be easily moved to the valve closed position by rotating the sleeve 61 and camming the pins 73 inwardly in opposition to their springs to disengage from the indentations on the interior wall of the bore.

A filter assembly is adapted to be positioned inside the sleeve 61. The filter assembly comprises a cylindrical filter cartridge 78 which includes an open chamber 79 within which a V-shaped filter element 80 is mounted. The positioning pin 63 extends into the filter cartridge 78 and holds it in place. The outside diameter of the filter cartridge 78 is slightly less than the inside diameter of the hollow sleeve 61, allowing the sleeve to rotate in the bore 60 around the filter cartridge. The filter cartridge 78 however, does not rotate when the sleeve rotates because the pin 63 extends into the filter cartridge, holding the filter cartridge in place.

Figure 4:
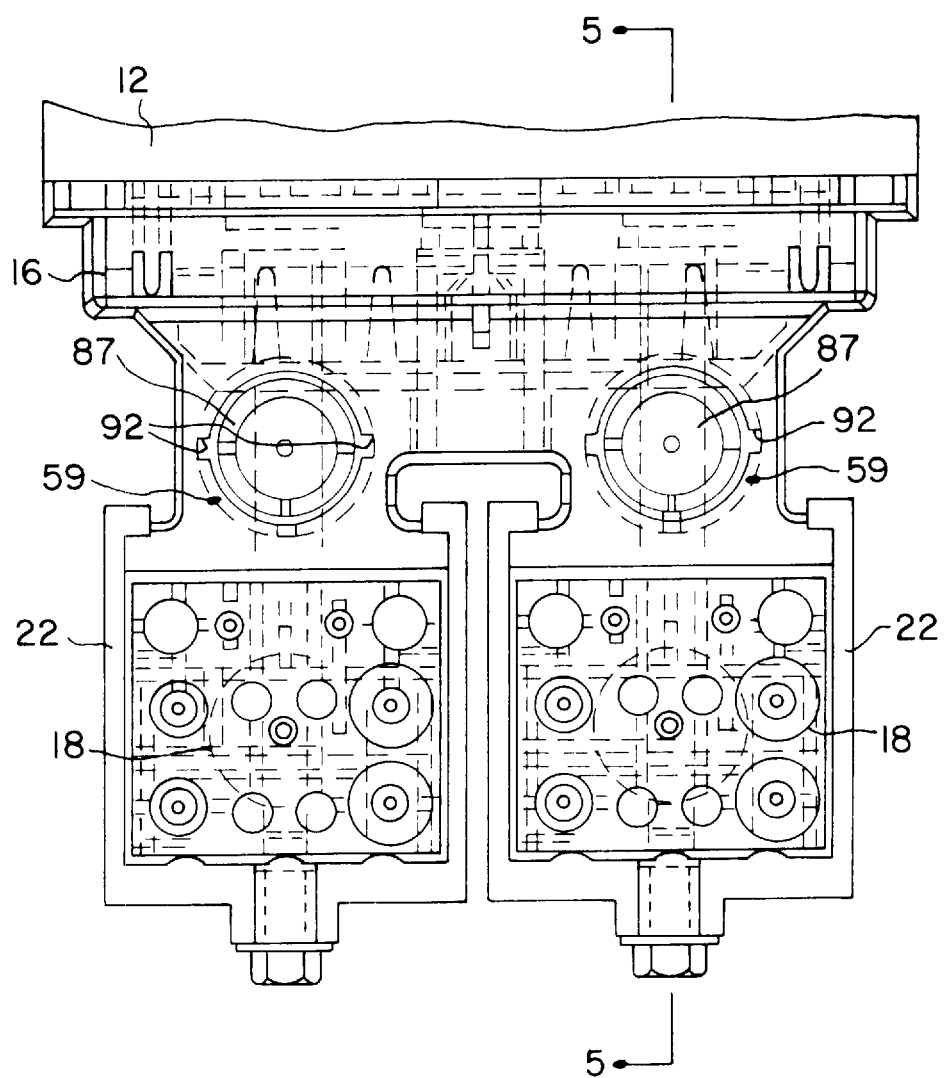
FIG. 4 is a front elevational view of a portion of the thermoplastic supply system of FIGS. 1–3 showing the reservoir block.

A disc 85 is attached to the front end of the filter cartridge 78 by a bolt 86. A knob assembly 87 is attached to the front of the disc with bolts 88. A pair of engaging arms 89 extend from the rearward surface of the disc 85 and are capable of extending into a pair of radial extending slots 90 on the sleeve collar 72. When the disc arms 89 engage the sleeve collar slots 90, rotation of the knob assembly 87 causes the sleeve to rotate within the bore 60 in the reservoir block 16. The disc 85 also has a pair of tabs 91 which extend radially outwardly. The tabs 91 are adapted to fit within corresponding horizontally disposed tab slots 92 (FIG. 4) located at the front opening of the bore 60 in the reservoir block 16. The tab slots 92 provide an entrance for circumferential slots around the opening in the bore 60 to provide a bayonet connection for the disc within the bore in the reservoir block 16. A pair of positioning pins 93 extend radially outwardly on the tabs 91 and are capable of engaging corresponding detents within the circumferential slot when the tabs are radially disposed in the circumferential slot, signifying that the valve is in the open position.

In use, the valve assembly is inserted into the bore 60 and held in place by the engagement of the pins 73 within the corresponding indentations in the reservoir block 16. With the openings 66 axially aligned with the passageway 54 in the reservoir block 16, the molten thermoplastic material from the reservoir is free to flow through the passageway to the manifold assembly 18. To close the valve, the user turns the knob assembly 87 which rotates the disc 85. The arms 89 extending from the rear of the disc 85 engage the corresponding forward slots 90 on the sleeve collar, causing the sleeve 61 to rotate. The rotational movement of the sleeve 61 is restricted by the movement of the pin 63 within the arcuate slot 64 on the rear wall of the sleeve. From the valve open position, the sleeve 61 can only be rotated clockwise until in reaches the valve closed position in which the closed side wall of the sleeve is aligned with the end of the passageway 54 at the upper end of the bore 60. The drain hole 67 is then aligned with the passageway at the lower end of the bore 60 allowing an residual material in the filter chamber 79 to drain while the valve is closed. The valve can be re-opened by turning the knob assembly 87 in the opposite direction to allow the openings 66 to be again aligned axially with the passageway 54. When the valve is open, the molten thermoplastic material from the reservoir flows through the sleeve 61 and through the filter chamber 79 formed in the filter cartridge 78. The material passes through the filter element 80, which keeps larger particles from reaching the pump.

To remove the filter element 80 for cleaning, the valve must first be closed. When the valve is in the closed position, the tabs 91 on the disc extend horizontally so that they are in registry with the corresponding tab slots 92 around the bore 60, allowing the disc 85 to be pulled from the bore in the reservoir block 16. The user pulls outwardly on the knob assembly 87 to disengage the arms 89 on the rear of the disc from the sleeve collar slots 90 which, in turn, allows the filter cartridge 78 to be removed from the sleeve 61. The filter assembly can then be removed for cleaning. To re-install the filter assembly, the user aligns the knob assembly 87 and the attached filter assembly so that the tabs 91 on the disc extend horizontally to match the horizontal alignment of the corresponding tab slots 92 around the bore 60 in the reservoir block 16. The user then inserts the assembly into the bore 60 and inserts the filter cartridge into the sleeve 61. When properly aligned, the pin 63 will fit into the corresponding opening in the filter cartridge 78 as the filter assembly is inserted into the sleeve 61, and the engaging arms 89 on the disc will fit into the corresponding slots 90 in the sleeve collar. Rotation of the knob assembly 87 will thereafter open and close the valve.

The sleeve 61 can also be removed for repair or replacement as necessary. To remove the sleeve 61 the positioning pin 63 is disconnected from the reservoir block 16. The pin 63 is threaded into the block at the rear of the bore 60 and is accessible from the rear of the reservoir block 16. With the pin 63 removed, the sleeve 61 can be withdrawn from the bore 60. The sleeve 61 is replaced by inserting the sleeve into the bore 60 so that the pin 63 is aligned with the mounting hole for the pin at the rear of the bore 60. The pin 63 is secured from the rear of the reservoir block 16, and the sleeve 61 is then captured within the bore.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

What is claimed is:

1. A system for supplying molten thermoplastic material to a dispenser, comprising:
   a hopper for receiving the thermoplastic material;
   a heater associated with the hopper for melting the thermoplastic material;
   a flow passage for receiving molten thermoplastic material, at least at portion of the flow passage having a relatively straight axis of flow;
   a pump assembly for receiving the molten thermoplastic material from the flow passage and for pumping the molten thermoplastic material to the dispenser; and
   an assembly having a rotatable valve and a filter positioned in said portion of the flow passage, the valve having an axis of rotation transverse to the straight axis of flow and being capable of rotating between an open position which allows the molten thermoplastic material to flow through the flow passage and a closed position which blocks the flow of the molten thermoplastic material through the flow passage, the filter being rotationally stationary relative to the valve member for filtering the molten thermoplastic material flowing through the flow passage when the valve is in the open position.

2. A system for supplying molten thermoplastic material as set forth in claim 1, wherein the filter is independently removable from the assembly in a direction transverse to the straight axis of flow and parallel to the axis of rotation of the valve.

3. A system for supplying molten thermoplastic material as set forth in claim 2, wherein the assembly includes an interlock which permits the filter to be removed only when the valve is in the closed position.

4. A system for supplying molten thermoplastic material as set forth in claim 1, wherein the valve comprises a sleeve, and the filter comprises a cartridge capable of being mounted within the sleeve.

* * * * *